May 10, 1927. 1,627,917
A. F. MASURY
VIBRATION DAMPENER
Filed April 23, 1926
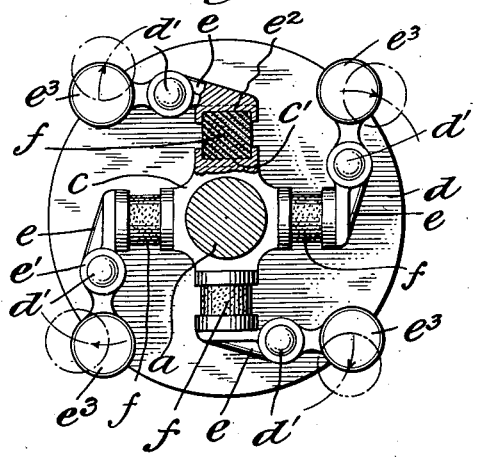
Fig.1.
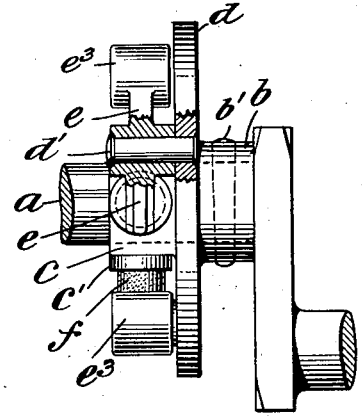
Fig.2.
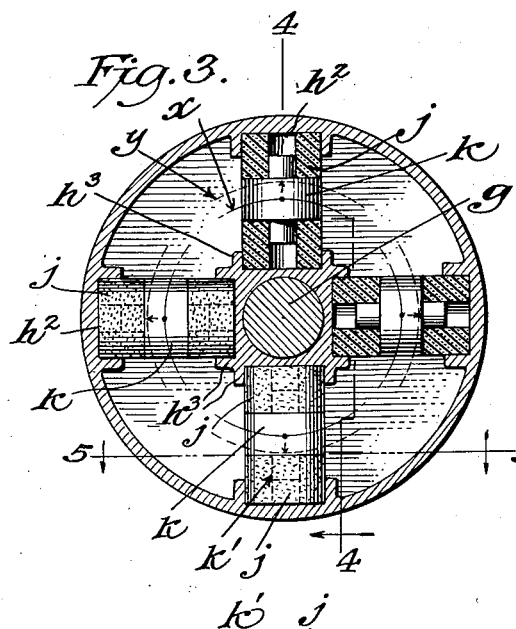
Fig.3.
Fig.4.
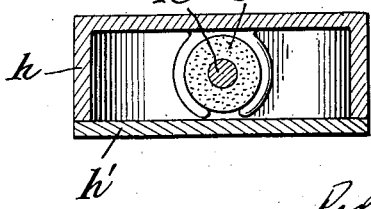
Fig.5.
Inventor
Alfred F. Masury
By his Attorneys
Redding, Greeley, O'Shea & Campbell.

Patented May 10, 1927.

1,627,917

UNITED STATES PATENT OFFICE.

ALFRED FELLOWS MASURY, OF NEW YORK, N. Y., ASSIGNOR TO INTERNATIONAL MOTOR COMPANY, OF NEW YORK, N. Y., A CORPORATION OF DELAWARE.

VIBRATION DAMPENER.

Application filed April 23, 1926. Serial No. 104,242.

In the construction of motors of the modern internal combustion type, where four, six or more cylinders deliver power to a single crank shaft, it has been found that there exists a certain point in the speed curve of the motor where violent destructive vibration occurs. This has presented a serious obstacle in properly mounting the motor and providing a design which insures smooth operation over the complete range of the load or speed characteristic curve.

The cause of the above vibration is the fact that at such point, or speed of operation, the power impulses imparted to the crank shaft from the individual power sources, cumulate the torsional stresses set up in the crank shaft as a result of its inherent characteristics, length and points at which such power impulses are applied, and result in a violent vibration of the entire structure. This critical point, or harmonic vibration, is analogous to the cumulative effect that proper periodic applications of power to a pendulum have on its amplitude of swing. In the crank shaft this torsional vibration is highly objectionable and it is the purpose of this invention to eliminate the same and provide smooth operation over the entire range of speed.

The manner in which this is accomplished is by providing a device which has an inertia of rotation, different for each speed, and as the motor changes speed, it must overcome the inertia of the device. In this manner, inherent oscillations will be damped out and the above named operation is achieved.

For a more detailed description of the device reference will now be had to the accompanying drawings forming a part hereof, wherein:—

Figure 1 is a front elevational view, partly in section, of a form of the device.

Figure 2 is a side elevation of the device of Figure 1.

Figure 3 is a front sectional elevation of a modified form of the device taken on the section line 3—3 of Figure 4.

Figure 4 is a side sectional elevation, of the device of Figure 4 and taken on the line 4—4 of Figure 3.

Figure 5 is a section taken on the line 5—5 of Figure 3.

In Figures 1 and 2, $a$ indicates the crank shaft of an internal combustion engine which carries a collar $b$ secured thereto as by a pin $b'$. Carried by the collar $b$, is the spider $c$ which is provided with seats $c'$ adapted to receive suitable rubber blocks to be described later.

The collar also has, integral therewith, a disc $d$ which serves as a spider for providing fulcrums for the inertia elements presently described. Crank arms $e$ are pivoted at $e'$ to studs $d'$ mounted on the disc $d$ and these crank arms carry, at one extremity, seats $e^2$ and at the other end weights $e^3$. Between the co-operating seats $c'$ and $e^2$ of the several elements, blocks of rubber $f$ or other resilient material is placed.

It will be observed that when the crank shaft is rotated the weight will fly outwardly and compress the rubber $f$. The greater the speed of rotation, the greater will be the inertia of the weight due to their increased distance from the center of rotation. In order that the speed of rotation be changed, this inertia must first be overcome and in this manner, torsional vibrations are effectively damped.

In the modification shown in Figures 3, 4 and 5, shaft $g$ carries housing $h$, secured thereto by flange $i$ bolts $i'$ and pin $i^2$. The housing is closed by face plate $h'$.

Housing $h$ carries seats $h^2$ on its internal periphery and at its hub is provided with seats $h^3$ co-operating with the former. Mounted in each seat is an annulus of rubber or other resilient material $j$ and between each opposed pair of annuli is positioned a weight $k$. This weight may consist of a cylindrical section supplemented by a cylindrical pin or stud $k'$, on either of the flat surfaces of the weight $k$. These pins or studs are received by the hollow portions of the resilient elements and, when assembled, constitute supporting means for the individual weight or inertia elements.

As will be noted from the comparative circles $x$ and $y$, the centers of mass of the weights will vary depending upon the speed of rotation of the shaft $g$ and exert the damping force necessary to insure smooth operation of the engine.

From the above it will be seen that a vibration damping device has been provided, operating on the inertia principle, which effectively eliminates the objectionable characteristics of motor operation noted above.

What I claim is:

1. A vibration damping device comprising a rotating member, a plurality of pivoted elements, means to mount said elements with the rotating member, inertia means on one end of said pivoted means, seats on the opposite ends, co-operating seats on the rotating means, and means mounted between the co-operating seats to resist movement of the inertia means due to rotation of the rotating member.

2. A vibration damping device comprising a rotating member, a plurality of pivoted elements, means to mount said elements with the rotating member, inertia means on one end of said pivoted means, seats on the opposite ends, co-operating seats on the rotating means, and non-metallic yielding cushioning means mounted between the co-operating seats to resist movement of the inertia means due to rotation of the rotating member.

This specification signed this 17th day of April A. D. 1926.

ALFRED FELLOWS MASURY.